United States Patent [19]

Patte et al.

[11] Patent Number: 4,932,334
[45] Date of Patent: Jun. 12, 1990

[54] METHOD AND APPARATUS FOR REMOVING POLLUTANTS FROM INCINERATOR FUMES

[75] Inventors: Philippe Patte, Nancy; Denis Marchand, Le Pecq, both of France

[73] Assignee: Sogea, Rueil-Malmaison, France

[21] Appl. No.: 336,358

[22] Filed: Apr. 11, 1989

[30] Foreign Application Priority Data

Apr. 11, 1988 [FR] France ................. 88 04919

[51] Int. Cl.⁵ ............................................. F23J 3/00
[52] U.S. Cl. ............................................. 110/216; 55/82; 55/269; 165/921
[58] Field of Search ............ 110/203, 216, 345; 165/DIG. 921; 55/8, 82, 269

[56] References Cited

U.S. PATENT DOCUMENTS

| 4,526,112 | 7/1985 | Warner | 110/216 X |
| 4,682,549 | 7/1987 | Hall | 55/269 X |
| 4,704,972 | 11/1987 | Marchand | 110/216 X |

FOREIGN PATENT DOCUMENTS

| 0160812 | 11/1985 | European Pat. Off. |
| 2592812 | 7/1987 | France |

*Primary Examiner*—Edward G. Favors
*Attorney, Agent, or Firm*—Sughrue, Mion, Zinn, Macpeak and Seas

[57] ABSTRACT

Garbage incinerator fumes containing water vapor and HCl are drawn downwardly over a cooled tube bundle (41) in a vertical heat exchanger (4), whereat the water vapor condenses and the HCl dissolves in the condensate, which then falls into a collection reservoir (43) for siphon removal. The fumes are maintained above their dew-point temperature throughout the process.

8 Claims, 1 Drawing Sheet

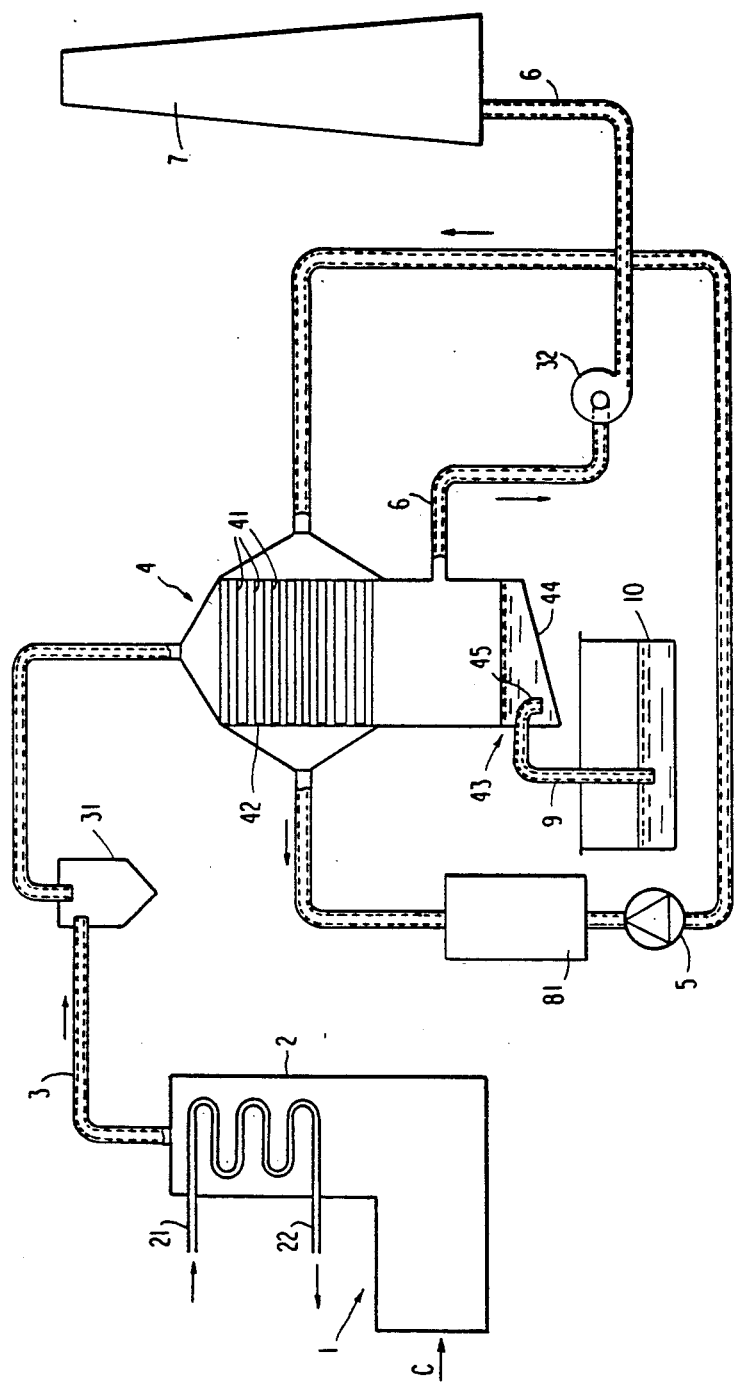

METHOD AND APPARATUS FOR REMOVING POLLUTANTS FROM INCINERATOR FUMES

BACKGROUND OF THE INVENTION

This invention relates to a method and apparatus for reducing, in fumes containing condensable elements, the content of non-condensable gaseous elements which are soluble in these condensable elements.

More particularly, the purpose of the present invention is to provide a method and apparatus for reducing the HCl content in fumes containing water vapor, which are produced by the incineration of waste products such as household garbage.

Indeed, the destruction through incineration of waste products containing chlorine, mainly in the form of plastic chlorinated substances (especially polyvinyl chloride - PVC), leads to the presence of gaseous HCl in the fumes in varying amounts according to the source of the waste products. For example, for household garbage, the average HCl content is about 1 g/Nm$^3$ under standard evaluation conditions (7% $CO_2$ or 11% $O_2$) for which the maximum release amounts have been determined.

U.S. Pat. No. 2,592,812 describes a method and apparatus for reducing the amounts of acidic pollutants in fumes from which dust has been removed and which have been subjected to a cooling phase before being released into the atmosphere. In this procedure, the fumes are cooled at a temperature lower than their dew-point temperature, thereby producing condensation of the water vapor.

Thus, the fumes which are discharged from the heat-exchanger device are saturated with water vapor, and the harmful pollutants still present are in solution in the water droplets.

It is, therefore, necessary to install, downstream from the heat-exchanger device, a device for the removal of vesicles which captures the droplets being released from this exchanger.

The droplets generated by a device of this kind are very small, since they are the product of condensation in situ, in the fumes, of the water vapor around condensation cores. Thus, the vesicle-removal device, which may be a Venturi tube, uses excessive amounts of energy and easily becomes clogged with soot. Furthermore, this vesicle-removal device generates a loss of load on the order of 300 daPa.

To do without this vesicle-removal device, different installation arrangements have been suggested, all of which are based on the reheating of the fumes before releasing them in a non-saturated state.

In any event, the installation of the vesicle-removal device or the reheating system is complicated, burdensome, and difficult to maintain.

SUMMARY OF THE INVENTION

The purpose of the present invention is therefore to provide a method and apparatus for reducing the amount of gaseous, water-soluble pollutants in fumes, according to which, once the pollution has been reduced, the fumes are released without undergoing any further treatment, in a state in which they are not saturated with water vapor, and free from vesicles formed from condensates.

A further goal of the invention is to furnish a device which allows sizable outputs of fumes to be treated without producing deterrent losses of load and provides for a gaseous pollution abatement efficiency level of above 80%.

The invention has, therefore, as an objective, a procedure for reducing, in fumes containing condensable elements, the content of non-condensable gaseous elements soluble in the condensable elements, according to which the fumes are subjected to a cooling phase during which the condensable elements condense, the incondensable elements being absorbed from within the fumes into the condensates, and the fumes, at the end of the cooling phase, being unsaturated with condensable elements.

Another objective of the invention is a procedure for reducing the HCl content in fumes produced from the combustion of household garbage which contain water vapor and HCl, in which procedure the fumes are cooled, the water vapor condenses, and the HCl is absorbed from within the fumes into the condensed water, the smoke being unsaturated with water vapor at the end of the cooling phase.

BRIEF DESCRIPTION OF THE DRAWINGS

The single drawing FIGURE shows a simplified diagram of an apparatus for the treatment of combustion fumes according to the invention.

DETAILED DESCRIPTION OF THE PREFERRED EMBODIMENT

According to the method of the invention, the fumes to be treated, which contain a condensable vapor phase and an incondensable gaseous non-water-soluble phase produced, for example, by the incineration of household garbage, are, following dust removal which lowers their dust content below 50 mg/Nm$^3$, cooled to a temperature above their dew-point temperature TR.

This cooling is effected by the circulation of the fumes awaiting treatment within a heat exchanger incorporating a cold wall, in which the wall temperature TS is lower than the dew-point temperature TR of the fumes to be treated, the fumes being introduced into the exchanger at an input temperature TFe on the order of 250° C. and having a water-vapor content on the order of 100 g per kg of dry fumes.

Thus, since the fume temperature TF is continuously above the dew-point temperature TR, the condensable phase will condense only upon contact with the cold wall.

In fact, if the fumes, composed of a condensable vapor phase and an incondensable gaseous phase, are made to circulate at a temperature TF above the dew-point temperature TR in an exchanger having cold walls whose temperature TS is below the dew-point temperature TR, the pressure Pv of the condensable phase will fall abruptly in the area of the cold wall and will reach a pressure Pv* at the wall temperature TS which is lower than the saturated vapor pressure Pvs at the dew-point temperature TR. Thus, a film of condensates will form on the surface of the cold wall.

If Pg is the pressure of the water-soluble incondensable gases and Pi is the pressure of the non-water-soluble incondensable gases, then the total pressure (Pg+Pv+Pi) is constant and equal to the atmospheric pressure. If Pv falls in the area of the cold wall, (Pg+Pi) must increase by the same value, since (Pg+Pv+Pi) is constant, Pg and Pi thus increasing in the same proportions. Thus, above the film of condensates formed on the surface of the cold wall, a film of incondensable gases will be created, within which a strong pressure gradient will exist. In this way, by diffusion, the water-soluble incondensable gases present in the fumes will migrate into this film of gases and be absorbed into the film of condensates.

The thermal-exchange process captures the latent condensation heat and the perceptible heat in the film of incondensable gases, but recovers only slightly the perceptible heat within the fumes.

Furthermore, since the wall temperature TS is substantially lower than the dew-point temperature TR of the fumes, the thermal-exchange process is very effective as regards condensation, but not high-performing in the area of exchanges of perceptible heat.

The temperature of the fumes decreases gradually through contact with the film of incondensable gases, which is in contact with the film of condensates.

Since the fumes continue to circulate in the heat exchanger equipped with cold walls and since the temperature TF continues to decrease but remains greater than its dew-point temperature TR, the condensable vapor phase will continue to condense only on the surface of the cold walls of the exchanger, whose temperature TS is always below the dew-point temperature TR of the fumes which are in contact with it, by at least 20° C.

The content of the water-soluble incondensable gases dissolved in the film of condensates decreases as the fumes circulate in the exchanger, and the content of incondensable gases in the fumes decreases in a parallel fashion, so that the difference between the gas pressures in the fumes and the partial pressures above the film of condensates is maintained at a level such that condensation continues to function as previously described, and, in particular, to the end of the exchanger process.

Under these conditions, since the exchanger is not infinitely long, the fumes are discharged from it at a temperature TFs that is greater than the final dew-point temperature TRs, humidity being well below 100%, and the water-soluble incondensable gas content being substantially reduced.

The liquid phase, which condensed on the surface of the cold wall and in which the incondensable gases were dissolved, is collected by flow and carried away to the outside of the exchanger.

Upon being discharged from the heat exchanger, the fumes, which are released from the exchanger at a discharge temperature TFs on the order of 60° C. and are not saturated with water vapor, contain no droplets; thus, the incondensable gases not eliminated are not found in solution in the evacuated fumes. Thus, the process according to the invention does not require the presence of any device to remove the droplets of condensates, which would be released upon discharge from the heat exchanger.

The fume-treatment apparatus for implementing the invention, as shown in the drawing, is connected to a combustion device 1 equipped with a heat-recovery boiler 2 in which water is fed by means of a conduit 21 and which produces steam which is released through a conduit 22. The fumes generated by the combustion of a fuel C leave the boiler 2 through a conduit 3 at a relatively low temperature, e.g., between 250° and 300° C. The fumes then pass through a dust-removal device, represented here by a dust precipitator 31, but which could be replaced by another device, for example an electrostatic dust-removal device, which lowers the dust content of the fumes below 50 mg/Nm$^3$.

The dust-free fumes then pass through a thermal-exchange device 4, which is made up of a fume-fluid exchanger comprising a multiplicity of cold surfaces, for example tubes 41 forming a bundle, which transport a cooling fluid fed by a pump 5, while the fumes circulate over the outside surfaces of the tubes in the space delimited by end-plates 42 and a casing external to the bundle (not shown). The thermal exchanger may be of the counter-current, co-current, or cross-current types. The fumes pass through it following a descending, vertical path. The water vapor which condenses on the cold surface of the thermal heat exchanger 4 while absorbing a load of soluble, incondensable compounds, is collected by a device 43 located at the base of the exchanger, then discharged to the outside through a conduit 9 leading to a tank 10, where reagents R are used to neutralize the solution.

In fact, condensation on the cold walls of the exchanger produces large droplets which fall from cold wall to cold wall, until, finally, they end their fall at the base of the exchanger in the collecting device 43 comprising an inclined wall 44 forming a reservoir into which a siphon 45 extends, the siphon being extended by the conduit 9. This siphon prevents any fumes from being drawn into the conduit 9.

The cooled fumes, unsaturated with water vapor, leave the exchanger 4 through a conduit 6 located in its lower portion, above the collecting device 43, and are aspirated through a ventilator or blower 32 which releases them into a chimney 7, the conduit 6 and the ventilator 32 thus constituting the device for the transfer of the fumes treated in the exchanger 4 to the chimney 7. It should be noted that, in a variant, the ventilator 32 could also be located on the conduit 3 upstream from the exchanger 4. Thus, the device for the transfer of the fumes from the exchanger 4 to the chimney 7 has no device for vesicle removal.

Because the fumes circulate in the exchanger at a speed on the order of 1.5 to 2 m/s and the large droplets collected by the device 43 are propelled at a speed greater than 5 m/s, the fumes released through the conduit 6 thus contain no droplets, in contradistinction to previous procedures and devices in which, since the droplets produced are small in size and thus are driven at very low speeds, these droplets were driven into the conduit 6.

The fluid which cools the cold surfaces comprising the tubes 41, being reheated in the heat exchanger 4, circulates in a closed loop and is, at the outlet of the exchanger, driven toward a cooling loop 81, comprising a cooling tower or a plate-equipped exchanger, before being recirculated in the exchanger 4 by the pump 5.

According to a preferred embodiment, the thermal exchanger comprises graphite tubes which both resist corrosion and make it possible to cause the cooling fluid to circulate under high pressure.

| | TREATMENT OF INCINCERATION FUMES PRODUCED BY HOUSEHOLD GARBAGE-TEST RESULTS | | | | | | | | | |
|---|---|---|---|---|---|---|---|---|---|---|
| Flow-rate of treated fumes | Temp. of fumes (°C.) | | Dew-point temp. (°C.) | | HCL mg/Nm³ sec | | Efficiency rate of removal of | Temp. of cooling water (°C.) | | Flow-rate of cooling |
| kg sec/h | Entry | Discharge | Entry | Discharge | Entry | Discharge | HCL (%) | Entry | Discharge | water m³/h |
| 5683 | 252 | 59 | 52 | 36.5 | 1245 | 180 | 85.5 | 20.1 | 28.3 | 58.2 |
| 5729 | 252 | 57 | 48.1 | 34.2 | 1017 | 214 | 79.0 | 18.8 | 26.5 | 58.2 |
| 8610 | 252 | 66 | 47.5 | 37.3 | 1334 | 199 | 85.3 | 23.9 | 31.9 | 68.4 |

Tests have been conducted in which fumes produced from the incineration of household garbage and containing more than 1 g of HCl per Nm³, were introduced into the thermal exchanger device 4 at a flow rate greater than 5,500 kg sec/h at a temperature TFe on the order of 250° C.

The cooling fluid used was water at a temperature lower than 40° C. More particularly, the water was circulated at a temperature on the order of 20° C, and flowed out of the thermal exchanger 4 at a temperature of about 28° C. at a flow rate of approximately 60 m³/h.

The fumes were discharged from the thermal exchanger 4 at a temperature of about 60° C., the HCl removal efficiency rate being above 80% and the water vapor content being approximately 40 g per kg. The fumes thus discharged had a relative humidity of about 30%.

The accompanying Table illustrates the various tests performed, and demonstrates the complete reliability of the process.

Other water-soluble, incondensable gaseous compounds, such as SO₂, NOx, and HF, may, of course, also be removed according to the same process using the same device.

Furthermore, condensable products such as metallic fumes or certain organic compounds are also eliminated using the process and device according to the invention. More particularly, tests have shown that fumes containing 321 g/Nm³ of mercury, following treatment according to the process described above, retained only 23 g/Nm³ of mercury upon leaving the thermal exchanger 4, thus representing an efficiency rate of about 95%.

What is claimed is:

1. A method for reducing the content of non-condensable gaseous elements soluble in condensable elements contained in fumes, comprising the steps of:
   (a) subjecting the fumes to a single, exclusive cooling phase during which the condensable elements condense by bringing the fumes into contact with a cold wall whose temperature TS is lower than the dew-point temperature TR of said fumes coming into contact with it,
   (b) allowing the incondensable elements to be absorbed from within the fumes into condensates such that the fumes, at the end of the cooling phase, are unsaturated with condensable elements,
   (c) maintaining the fumes at a temperature TF greater than said dew-point temperature throughout the cooling phase, and
   (d) discharging the unsaturated fumes exiting the cooling phase directly to atmosphere without any vesicle removal.

2. A method according to claim 1, wherein the fumes are generated by the combustion of household garbage and contain water vapor and HCl, the water vapor condensing and the HCl being absorbed from within the fumes into the water which has condensed, and the fumes, at the end of the cooling phase, being unsaturated with water vapor.

3. A method according to claim 1, wherein the cold wall is at a temperature TS lower by at least 20° C. than the dew-point temperature TR of the fumes coming into contact with it.

4. A method according to claim 3, wherein the cold wall is kept at the temperature TS by the circulation of water.

5. A method according to claim 4, wherein the water which maintains the temperature of the cold wall is at a temperature lower than 4020 C.

6. An apparatus for reducing the content of non-condensable gaseous elements, such as HCl, soluble in condensable elements, such as water vapor, contained in combustion fumes, comprising:
   (a) a thermal exchanger (4) defining a fume passage and including cold wall means (41) disposed in said passage.
   (b) means for supplying combustion fumes to the exchanger,
   (c) means (5,81) for maintaining:
      1) the cold wall means at a temperature TS lower than the dew-point temperature TR of the fumes, and
      2) the fumes at a temperature TF greater than said dew-point temperature throughout the passage of said fumes through the exchanger,
   (d) a chimney (7) for releasing fumes treated by the exchanger into the atmosphere, and
   (e) means for transferring fumes treated by said thermal exchanger directly to the chimney, wherein the transfer means comprises an exhaust conduit (6) and a discharge blower (32).

7. An apparatus to claim 6, wherein the transfer means contains no device for the removal of vesicles.

8. An apparatus according to claim 7, wherein the thermal exchanger comprises a vertically oriented chamber, the cold wall means comprises a bundle of tubes extending laterally across an upper portion of the chamber, the maintaining means comprises means for circulating a coolant fluid through the tubes, an opening is provided at a top of the chamber for the introduction of the fumes, and a reservoir is disposed in a lower portion of the chamber for collecting condensate and dissolved non-condensable gaseous elements.

* * * * *